United States Patent
Aliaga et al.

(10) Patent No.: US 7,931,185 B2
(45) Date of Patent: Apr. 26, 2011

(54) DOUBLE-SHOULDERED WELDING DEVICE FOR THE FRICTION STIR WELDING OF PARTS, AND WELDING METHOD

(75) Inventors: Daniel Aliaga, Aubrevilliers (FR); Baptiste Guerin, La Roche sur Yon (FR); Francois Marie, Rueil Malmaison (FR)

(73) Assignee: European Aeronautic Defence and Space Company EADS France, Paris (FR)

( * ) Notice: Subject to any disclaimer, the term of this patent is extended or adjusted under 35 U.S.C. 154(b) by 0 days.

(21) Appl. No.: 12/680,262

(22) PCT Filed: Sep. 10, 2008

(86) PCT No.: PCT/FR2008/051613
§ 371 (c)(1),
(2), (4) Date: May 21, 2010

(87) PCT Pub. No.: WO2009/044077
PCT Pub. Date: Apr. 9, 2009

(65) Prior Publication Data
US 2010/0288820 A1 Nov. 18, 2010

(30) Foreign Application Priority Data
Sep. 27, 2007 (FR) ...................... 07 57888

(51) Int. Cl.
*B23K 20/12* (2006.01)
(52) U.S. Cl. .................... 228/112.1; 228/2.1
(58) Field of Classification Search .......... None
See application file for complete search history.

(56) References Cited

U.S. PATENT DOCUMENTS

| | | | |
|---|---|---|---|
| 5,460,317 A * | 10/1995 | Thomas et al. | 228/112.1 |
| 6,758,382 B1 | 7/2004 | Carter | |
| 7,686,202 B1 * | 3/2010 | Carter et al. | 228/2.1 |
| 2003/0209588 A1 * | 11/2003 | Colligan | 228/112.1 |
| 2004/0035914 A1 * | 2/2004 | Hempstead | 228/112.1 |
| 2004/0134058 A1 | 7/2004 | Murakami | |
| 2006/0043152 A1 * | 3/2006 | Stol et al. | 228/2.1 |
| 2006/0065694 A1 * | 3/2006 | Stol et al. | 228/2.1 |
| 2006/0289604 A1 * | 12/2006 | Zettler et al. | 228/2.1 |
| 2009/0050672 A1 * | 2/2009 | Waldron et al. | 228/2.1 |
| 2009/0065553 A1 * | 3/2009 | Burg et al. | 228/2.1 |
| 2009/0230173 A1 * | 9/2009 | Stol et al. | 228/112.1 |

FOREIGN PATENT DOCUMENTS

| | | | |
|---|---|---|---|
| JP | 2003-326376 A | * | 11/2003 |
| JP | 2004-114137 A | * | 4/2004 |
| JP | 2004-130367 A | * | 4/2004 |
| JP | 2004-202536 A | * | 7/2004 |
| JP | 2005-007466 A | * | 1/2005 |

OTHER PUBLICATIONS

International Search Report dated Apr. 15, 2009.

* cited by examiner

*Primary Examiner* — Kiley Stoner
(74) *Attorney, Agent, or Firm* — RatnerPrestia

(57) ABSTRACT

The invention relates to a double shouldered welding device for the friction stir welding of parts, in which at least one shoulder has two concentric rings providing two plane concentric bearing surfaces, the rings being arranged so that the smaller-diameter ring is capable of compressing the stirred material of the parts to be welded during advance of the welding device and so that the larger-diameter ring is capable of forming a sink-in stop for the smaller-diameter ring. The invention also relates to a method of friction stir welding by means of the welding device according to the invention, in which said device is force-driven.

7 Claims, 1 Drawing Sheet

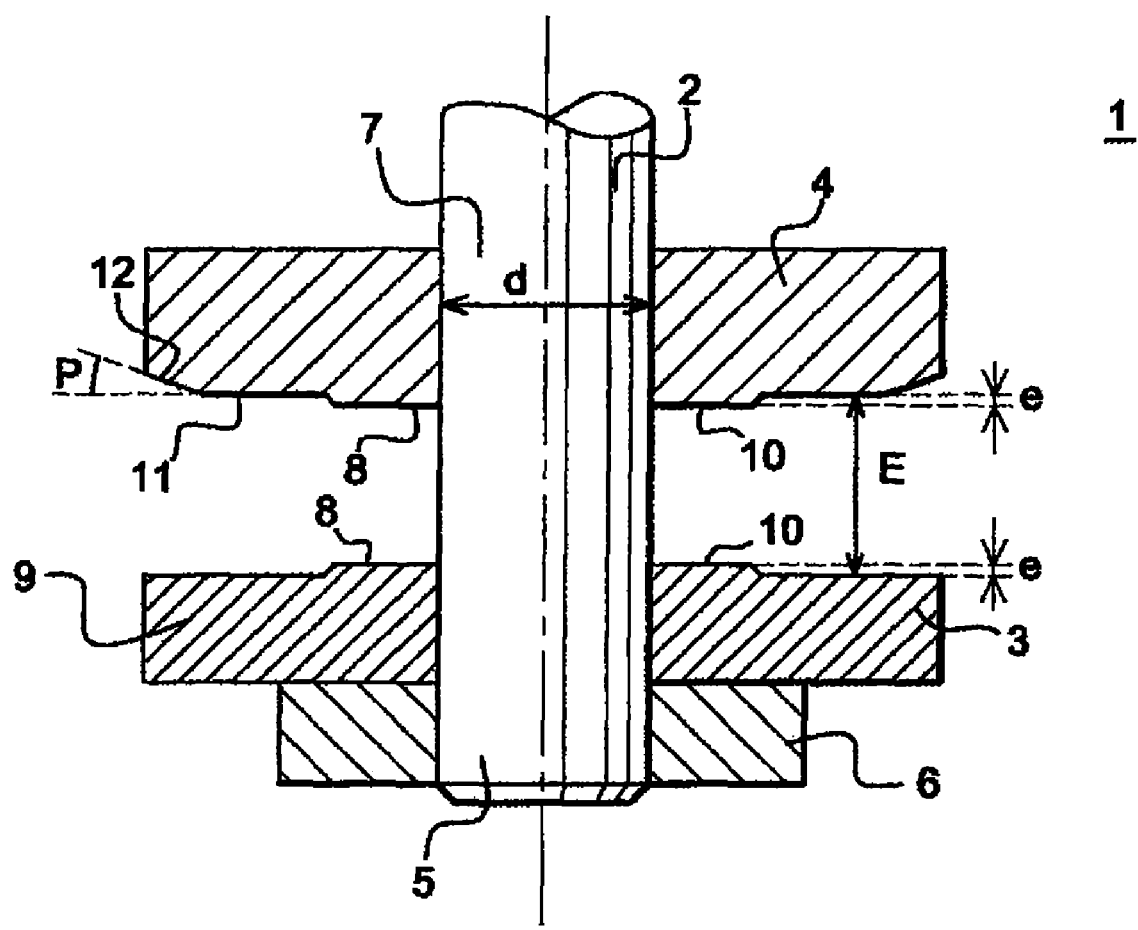
Sole figure

DOUBLE-SHOULDERED WELDING DEVICE FOR THE FRICTION STIR WELDING OF PARTS, AND WELDING METHOD

This application claims priority of PCT International Application No. PCT/FR2008/051613 filed on Sep. 10, 2008. The contents of which are incorporated herein by reference.

FIELD OF THE INVENTION

The present invention pertains to a double-shouldered welding device for the friction stir welding of parts, also called "friction stir welding bobbin tool." The present invention also pertains to a welding method using such a device. Applications of the present invention are found in any area requiring the butt welding or overlap welding of two parts, which may be made of metal alloys of any kinds, and especially made of aluminum alloy. Such a welding device is very particularly suitable for the welding of aircraft fuselage panels, but also for the welding of thicker panels such as those used at the level of the wing or wing center box, as well as for the welding of any structural component of a space vehicle, missile, motor vehicle, etc.

BACKGROUND

Such a device comprises a stir pawn designed to pass through the material to be welded and to be stirred as the welding device is advanced, as well as a lower shoulder and an upper shoulder. The lower shoulder is mounted fixed on the stir pawn, while the upper shoulder is mounted in translation along the stir pawn. It is thus possible to have a variable spacing between the two shoulders, between which the parts to be welded are intended to be housed. The double-shouldered welding device makes it possible to create a heating of the two sides of the welded joint and hence to have a better heat distribution. In addition, the lower shoulder absorbs the pressure force exerted by the upper shoulder, which makes it possible to weld parts that are not capable of absorbing the forging force of a conventional tool or a retractable pawn.

Currently, there are two major modes of controlling a double-shouldered welding device for the friction stir welding of parts, i.e., a controlled force control and a controlled spacing control between the two shoulders.

Controlled force or forced control is easier to use. It consists of applying a constant force between the two shoulders of the welding device. However, such a use does not make it possible to have a welded joint of constant thickness and may lead to significant decreases in thickness, or even to collapses of the joint. In fact, if the working temperature between the shoulders increases during the welding method, the forced control tends to cause an excessive compression of the material to be welded, which is accompanied by a discharge of the plasticized material to the outside of the welding device. In fact, with the resistance of the material decreasing more and more with the rise in temperature, maintenance of a constant force tends to require a greater and greater compression by the shoulders, which causes a racing of the system. Such a method is hence difficult to control.

Conversely, an applied spacing control makes it possible to work in a dimensional manner, to control the thickness of the welded joint and thus to obtain a joint of higher quality. Spacing is defined as the distance between the two shoulders of the welding device. Compression is defined as the difference between the thickness of the parts to be welded and that of the welded joint, i.e., the difference between the thickness of the parts to be welded and the spacing. Recent studies have made it possible to show that for sheets of a few mm, a very high quality is obtained for the welded joint by requiring a compression on the order of 100 μm. However, by fixing the spacing between the shoulders, the welding device may be led to require variable (too high or insufficient) forces on the parts to be welded because such a control mode cannot take into account slight variations in thickness of the parts to be welded. It necessitates means for measuring the thickness variations to take into account these variations and to allow a change in the spacing between the two shoulders.

SUMMARY OF THE INVENTION

In the present invention, an attempt is made to provide a double-shouldered welding device for friction stir welding, making it possible to control the compression of the parts to be welded and with an applied force control mode.

For this, at least one of the two shoulders of the welding device according to the present invention is formed by two concentric rings arranged one above the other, and fixed to one another. The smaller-diameter ring is directed to the inside, i.e., in the direction of the spacing provided between the two shoulders intended to receive the parts to be welded. Thus, the internal ring is capable of coming into contact with the parts to be welded. Conversely, the greater-diameter ring is directed to the outside of the device. The two concentric rings extend radially from the stir pawn of the welding device. The smaller-diameter ring is designed to be compressed in the material of the parts to be welded during the advancement of the welding device, extending radially to the periphery of the smaller-diameter ring, comes to a stop on the cold material of the parts to be welded, on both sides of the welded joint, thus limiting the sinking in of the smaller-diameter ring in the hot material stirred by the stir pawn as the welding device advances. The unevenness between the two surfaces carrying the shoulder makes it possible to fix the compression of the material on the smaller-diameter ring and prevents the racing of the method. Insofar as the constant force control is most suitable for production because it makes it possible to compensate for industrial geometric imperfections such as thickness variations, the double-shouldered welding device according to the present invention is advantageously used for the friction stir welding with forced control. Thus, when the welding device according to the present invention is used with constant force control, the support surface of the greater-diameter ring functions as a stop, limiting the compression. In the end, the constant force control of the welding device according to the present invention makes it possible to work with controlled compression regardless of the thickness of the parts to be welded.

Therefore, the object of the present invention is a double-shouldered welding device for the friction stir welding of parts, characterized in that at least one shoulder has two concentric rings, internal and external, respectively, providing two plane concentric support surfaces, the smaller-diameter internal ring and the greater-diameter external ring being arranged so that the internal ring is capable of compressing the stirred material of the parts to be welded during the advancement of the welding device, and so that the external ring is capable of forming a stop to limit the sinking of the internal ring into the stirred material by the support of the external ring on the parts to be welded on both sides of the welded joint.

The support surface of the internal ring is formed by the entire surface of the internal face of the internal ring, i.e., the face intended to be in contact with the parts to be welded. The support surface of the external ring is formed by the surface of the internal face of the external ring extending radially to the outside from the periphery of the internal ring, insofar as the external ring is situated above the internal ring. Therefore, the two support surfaces are situated one above the other and extend parallel to one another. The support surface of the external ring is sufficient to make it possible to stop the sinking of the shoulder into the material of the parts to be welded.

The presence of the external ring forming a stop to sinking makes it possible to control the width of the welded joint because only the internal ring is intended to sink into the material of the parts to be welded.

The lower shoulder is advantageously mounted fixed on a lower part of the stir pawn, while the upper shoulder is mounted in translation in an upper part of the stir pawn in order to be able to vary the spacing between the shoulders, and especially depending on the thickness of the parts to be welded.

The internal ring has a certain thickness, or height, making it possible to provide a step between the support surfaces of said internal ring and of the external ring.

According to the embodiment examples of the welding device according to the present invention, it is possible to provide all or some of the following additional features:

A distance between the support surface of the internal ring and the support surface of the external ring corresponds to the maximum sinking of the shoulder desired into the material of the parts to be welded. Said distance corresponds to the height, or thickness, of the internal ring, i.e., to the dimension of the internal ring extending at right angles to the plane surface of said ring.

A distance between the support surface of the internal ring and the support surface of the external ring ranges from 0.5% to 5% of the thickness of the parts to be welded. Thickness of the parts to be welded is defined as the dimension of the parts extending between the two shoulders of the welding device. Therefore, the thickness of the parts corresponds to the thickness of each of the parts at the level of the junction line in the case of butt welding, or to the cumulative thickness of the two parts in the case of overlap welding. Thus, a compression is obtained ranging from 0.5% to 5% if only one shoulder of the welding device has two concentric rings, and a compression ranging from 1% to 10% if the two shoulders of the welding device has two concentric rings.

The internal ring has an external diameter ranging from 1.2 to 2.5 times the external diameter of the stir pawn. The diameter of the internal ring corresponds to the width of the welded joint that is obtained after welding. The width of the welded joint is the dimension of the said joint extending transversely in relation to the axis of advancement of the welding device. The diameter of the internal ring is such that the sinking of said internal ring into the material is ensured.

The external ring has an external diameter ranging from 1.5 to 3.5 times the external diameter of the stir pawn. The support surface thus provided is capable of making a stop to limit the sinking of the shoulder into the material with the single internal ring.

The external ring may be provided on its external perimeter with a chamfer or with a neck mold, having a length or radius or 1 mm to 5 mm, respectively. Thus, one avoids having a sharp edge at the level of the external perimeter of the external ring, and therefore, during the control of the welding device, marking the parts to be welded on both sides of the welded joint when the external ring is supported on the surface of the parts to be welded.

At least one of the two shoulders has two concentric rings, which is the subject of the present invention. When only the first shoulder has an external ring and an internal ring, the second shoulder has a smooth surface. The control force is then applied such that the external ring of the said first shoulder serves as a stop.

When the two shoulders have each two concentric rings, which is the subject of the present invention, internal and external rings may have different diameters for each shoulder, and thus may not coincide.

The lower shoulder is mounted fixed on a lower part of the stir pawn, with the upper shoulder being mounted mobile in translation along the stir pawn so as to modulate the spacing between the two shoulders.

The present invention also pertains to a friction stir welding method by means of the welding device according to the present invention, in which the compression of the parts to be welded is fixed depending on their thickness; and the device is controlled with constant force.

The parts to be welded are arranged mounted one against the other if it is desired to perform butt welding. The welding device is then moved along the mounted edges to form the welded joint. Therefore, the welded joint will extend along said mounted edges.

In the case of overlap welding, the parts are arranged one above the other. The shoulders enclose the cumulative thickness of the two parts and slide each on the surface of one of the parts to be welded. The stir pawn passes through the cumulative thickness of the two parts and stirs the material of said two parts.

The compression is advantageously fixed between 0.5% and 5% of the thickness of the parts to be welded.

Advantageously, a welding force is fixed so that it allows a compression of material of the parts to be welded by the internal ring of at least one of the shoulders and blocks any additional compression of material once the support surface of the external ring of said shoulder is supported on the part or parts to be welded. Thus, when the external ring comes into contact with the parts to be welded, the force remains the same, but the compression does not increase because the external ring serves as a stop to sinking of the internal ring. The external ring has a larger support surface than the internal ring. Thus, the welding device is force controlled such that the value of said force is sufficient to guarantee penetration of the internal ring while ensuring support without penetration of the external ring.

For example, the control force provided to the support surface of the two rings is lower than 20 MPa and provided to the support surface of the internal ring is greater than 30 MPa.

The present invention shall be better understood after reading the following description and after examining the FIGURE that accompanies it. This is presented in an indicative and nonlimiting representation of the present invention.

BRIEF DESCRIPTION OF THE DRAWINGS

The sole FIGURE shows a schematic cross-sectional view of the double-shouldered welding device according to the present invention at the level of the welding head.

DETAILED DESCRIPTION

As this is visible in the sole FIGURE, the welding device 1 according to the present invention has a stir pawn 2 on which are mounted two lower 3 and upper 4 shoulders, respectively.

The lower shoulder 3 is mounted fixed on a lower part 5 of the stir pawn 2. A screw 6 forms a lower stop for the lower shoulder 3. The lower shoulder 3 is designed to be moved along a lower face of the parts to be welded during the movement of the welding device 1 along a welded joint of said parts to be welded. The upper shoulder 4 is mounted in translation along an upper part 7 of the stir pawn 2. It is thus possible to adjust a spacing E between the lower 3 and upper 4 shoulders.

In the example shown in the sole FIGURE, each of the shoulders 3 and 4 is provided with two concentric rings, internal 8 and external 9, respectively. Of course, it is possible to provide a welding device 1 in which only one of the two shoulders is provided with two concentric rings.

The internal ring 8 has a strictly lower diameter than the external ring 9. Advantageously, the external diameter of the internal ring 8 is equal to 1.2 to 2.5 times the external diameter d of the stir pawn 2, while the external diameter of the external ring 9 is equal to 1.5 to 3.5 times the diameter d of the stir pawn 2. An internal face 10 of the internal ring 8 forms a first support surface, while the internal face 11 of the external ring 9 extending radially from the support surface of the internal ring 8 forms a second support surface. Internal faces 10 and 11 are defined as the faces of the rings 8 and 9 of one of the shoulders considered directed towards the other shoulder.

The internal ring 8 has a thickness e corresponding to the maximum compression desired at the level of the parts to be welded, the thickness e corresponding to the distance separating the internal face 10 of the internal ring 8 of the internal face 11 of the external ring 9 of a shoulder 3, 4 in question.

The internal rings 8 of the shoulders 3 and 4 are designed to sink into the material of the parts to be welded so as to compress the material of the parts to be welded of twice the thickness e.

Advantageously, the angle separating the internal support surface 10 of the internal ring 8 and the internal support surface 11 of the external ring 9 is more or less equal to 90° so as to allow a free sinking of the internal ring 8 into the material and to perfectly control the width of the welded joint obtained by the welding device 1 according to the present invention. Width of the welded joint is defined as the dimension extending at right angles to the longitudinal axis of said welded joint obtained. The plane support surface of the external ring 9 forms a stop limiting the sinking of the corresponding shoulder into the material of the parts to be welded.

It is possible to provide at the level of the external perimeter of the external ring of at least one shoulder 4 a chamfer or a edge neck mold 12. The chamfer or neck mold 12 makes it possible to suppress the sharp edge of the external edge of the shoulder 4 which comes into contact with the parts to be welded when the external rings 9 of the shoulders 3, 4 are stopped against the parts to be welded. The shoulder 4 is thus prevented from scratching the parts to be welded during the advancement of the welding device 1 along the welded joint. Of course, it is possible to provide the two external rings 9 of the two shoulders 3 and 4 with such a chamfer 12.

By fixing the thickness e, i.e., the distance between the internal 8 and external 9 rings of a shoulder 3, 4 of the welding device 1 according to the present invention, a maximum compression is required during the use of the welding device according to the present invention, even though this device may be advantageously force controlled.

The welding device 1 according to the present invention makes it possible to weld all alloys and especially aluminum alloys, including structurally hard alloys which are known to be difficult to weld using fusion techniques, including lithium alloys which have difficulties with friction stir welding because of their lower thermal conductivity.

Example 1

Butt Welding of Sheets Made of Aluminum-Lithium Alloy 2198T8

Thickness of each of the parts E=2.5 mm
Dimensions of each of the parts: 1,000×300 mm
Dimensions of the welding device:
external diameter of the stir pawn d=6 mm
external diameter of the internal ring=12 mm
external diameter of the external ring=18 mm
thickness of the internal ring e=0.05 mm
the two shoulders are provided with an internal ring and with an external ring.
The welding device is force controlled, with a force=3 kN, i.e., 35 MPa.

Example 2

Butt Welding of Parts Made of Aluminum Alloy 7449W

Thickness of each of the parts E=15 mm
Dimensions of the welding device:
external diameter of the stir pawn d=15 mm
external diameter of the internal ring=23 mm
external diameter of the external ring=29 mm
thickness of the internal ring e=0.1 mm
the two shoulders are provided with an internal ring and with an external ring.
The welding device is force controlled, with a force=8 kN, i.e., 33.5 MPa.

More generally, the spacing E advantageously ranges from 2 mm to 20 mm and the thickness e from 0.05 mm to 0.2 mm. Thus, one prevents too much material from being stirred, leading to a fast overheating of the parts in their joining.

What is claimed is:

1. A welding device for friction stir welding of parts comprising a first shoulder and a second shoulder facing the first shoulder, each of the first shoulder and second shoulder comprising an internal ring and an external ring adjacently bordering on and arranged concentrically around the internal ring, the internal rings configured to compress stirred material of parts to be welded during an advancement of the welding device, each internal ring and each external ring consisting of a continuous support surface extending entirely within a two dimensional plane, the support surfaces extending parallel to one another, the support surface of each internal ring separated by the support surface of the adjacent external ring by a step transition, the support surfaces of the internal rings spaced apart by a first distance, and the support surfaces of the external rings spaced apart by a second distance, the first distance being less than the second distance, and the difference between the first and second distances corresponding to a maximum compression of parts to be welded, each external ring forming a sink-in stop for the adjacent internal ring that it surrounds to limit the sinking of the internal rings into the stirred material by supporting the external rings on the parts to be welded on both sides of a weld.

2. A welding device in accordance with claim 1, wherein a distance between the support surface of each internal ring and the support surface of the surrounding external ring ranges from 0.5% to 5% of a thickness of the parts to be welded.

3. A welding device in accordance with claim 1, wherein the internal rings have an external diameter ranging from 1.2 to 2 times an external diameter of a stir pawn, and in that the external rings have an external diameter ranging from 1.5 to 3.5 times an external diameter of the stir pawn.

4. A welding device in accordance with claim 1, wherein the two shoulders are provided with two concentric rings.

5. A method of friction stir welding of parts by means of the welding device in accordance with claim 1, comprising:
arranging the parts to be welded in contact with one another in the position in which the parts are to be welded;
setting the compression of the parts to be welded depending on a thickness of the parts; and
controlling the device at a constant force.

6. A method in accordance with claim 5, wherein the compression is set between 0.5% and 5% of the thickness of the parts to be welded.

7. A method in accordance with claim 5, wherein the control force applied to the support surfaces of the external rings is lower than 20 MPa and the control force applied to the support surfaces of the internal rings is greater than 30 MPa.

* * * * *